(12) United States Patent
Griffith et al.

(10) Patent No.: US 11,647,125 B2
(45) Date of Patent: May 9, 2023

(54) METHOD FOR IMPLEMENTATION OF PUSH SCAN FUNCTIONALITY

(71) Applicant: XEROX CORPORATION, Norwalk, CT (US)

(72) Inventors: Jeremy Griffith, Rochester, NY (US); John Allott Moore, Victor, NY (US); Keith S Watson, Spencerport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/331,721

(22) Filed: May 27, 2021

(65) Prior Publication Data

US 2022/0385772 A1 Dec. 1, 2022

(51) Int. Cl.
G06F 15/00 (2006.01)
H04N 1/00 (2006.01)

(52) U.S. Cl.
CPC ..... *H04N 1/00228* (2013.01); *H04N 1/00214* (2013.01); *H04N 1/00225* (2013.01); *H04N 1/00233* (2013.01); *H04N 1/00331* (2013.01)

(58) Field of Classification Search
CPC ........... H04N 1/00228; H04N 1/00214; H04N 1/00225; H04N 1/00233; H04N 1/00331

USPC ....................................................... 358/1.15
See application file for complete search history.

(56) References Cited

U.S. PATENT DOCUMENTS

| | | | |
|---|---|---|---|
| 7,243,126 B2 * | 7/2007 | Sasaki | H04N 1/00212 709/203 |
| 8,302,166 B2 | 10/2012 | Balakrishnan et al. | |
| 8,334,996 B2 | 12/2012 | Smith | |
| 2014/0002857 A1 * | 1/2014 | Huang | H04N 1/00278 358/1.15 |
| 2014/0006562 A1 * | 1/2014 | Handa | H04L 29/0809 709/219 |
| 2014/0226182 A1 | 8/2014 | Lee et al. | |

* cited by examiner

Primary Examiner — Mark R Milia

(57) ABSTRACT

The present disclosure discloses methods and systems for scanning a document at a scan capable device. The method and systems comprise receiving user credentials from a graphical user interface, displaying scan capable devices on a network, creating a shared network folder accessible to a scan capable device, sending a user credential corresponding to the shared network folder to the scan capable device, creating a selectable data entry on the scan capable device corresponding to the network folder, and upon selection of the selectable data entry, digitizing a document and sending the digitized document to the shared network folder corresponding to the selectable data entry.

21 Claims, 5 Drawing Sheets

METHOD FOR IMPLEMENTATION OF PUSH SCAN FUNCTIONALITY

FIELD OF THE INVENTION

The present disclosure relates to improving the distribution of digitized data on a network by automatically establishing push-scan functionality on a scan capable device. The improved method supports the widespread implementation of push-scan functionality in organizations with minimal IT resources. The improved capability of scanning directly to a shared network folder facilitates increased document security, efficiency, and user experience.

BACKGROUND

Modern office spaces utilize resources like multi-function devices (MFD), printers, fax machines, scanners, and other digital imaging processing systems to scan user documents, produce a digital version of the document, and distribute the digitized data back to a computer for further distribution or modification. Digitized data is the preferred format in the modern office due to the ease of distribution, zero reproduction cost, and accessibility. Digitized data can be distributed by a range of techniques dependent on the device hardware and software capabilities, the capability of the user, and the digital ecosystem the device operates within. Digitized data is commonly distributed to local, network, or external locations through email, by uploading to a folder on the network, uploading to a local drive connected to the scan capable device, or other variations off data transfer based on the device capability. Each option for distributing digitized data has advantages and disadvantages, but often push-scan to a network folder is the preferred choice in an office environment. Other distribution methods run into logistic challenges, like attachment size to an email or a user forgetting a portable hard drive, that prevent successful transfer of the file to a location accessible by the user's computer. Sending large digitized files to a network folder accessible to the user's computer improves the user experience and is the preferred data distribution method when available. The technical knowledge required to establish push-scan functionality prevents widespread adoption of this preferred data distribution method.

Push-scan to network folder requires previously established network connections in the user's digital ecosystem. Establishing these digital connections requires more advanced knowledge often missing from small and mid-size companies. Small and mid-size companies without IT resources are often unable to use the push-scan functionality and default back to a less preferred solution, like uploading directly to an attached physical hard drive or emailing the file. Depending on the file size, target distribution, and internet bandwidth the document distribution becomes more complicated and potential for error increases. In the modern office effective data distribution is critical to a company's performance. There exists a need to simplify the implementation of push-scan functionality.

Scanning physical documents converts physical documents into digitized data. This digitized data needs to be moved from the scan capable device to some destination accessible by the user's computer in order to be useful. Common methods to distribute this digitized data are sending the file to a locally connected hard drive, sending the data to a network folder, or sending the file as an email attachment. Technical challenges exist for these methods based on the digital ecosystem the scan capable device operates in. One challenge email clients face is size limitations differences between sending and/or receiving email clients. Scanned documents often exceed the email client capability and multiple outcomes can occur when this size limitation is exceeded. One outcome is the scanned document is broken into manageable size pieces and emailed based on the client or pre-set sizes, but this capability is dependent on that specific MFD and the user's settings. Another challenge is the internet bandwidth and/or intermittent connectivity causes issues with the distribution of the digitized data. Distributing digitized data to a locally attached storage means, like a thumb drive, has high transfer speed and reliability but is less useful to the user who may want to distribute data to shared folders or multiple destinations. A locally attached distribution method also requires the user to have an additional piece of hardware readily available. The preferred choice is sending digitized data to a shared network folder.

The MFD push-scan to network folders has advantages over other delivery options. Often network folders have higher size limitations, upload speeds to these folders are significantly faster as the transfer occurs via a local network, the document remains on the user's potentially more secure network, among other advantages. Push-Scan to network folders are infrequently used due to customer's failure to successfully connect a network folder to the MFD. The existing process to establish a network folder often fails due to a lack of technical competency, particularly among organizations without dedicated Information Technology personnel. Users struggle to enable network share capability on their computer or network, identify the network address information for the network devices, and transfer these credentials effectively to the scan capable device. Users struggling to establish shared network folders translates into significant amounts of money in customer support calls, in addition to negative customer experiences that impacts future purchasing decisions. Clients recognize the useful aspects of push-scan to network folders, but struggle implementing the required technical steps in the existing digital ecosystem. There exists a need to simplify the implementation of push-scan functionality to improve the modern digital ecosystem experience.

User's struggle to configure their devices to implement push-scan functionality and fail to take advantage of an important tool in their workplace. An additional aspect of a scan capable device's capability, that is severely underutilized, is configuring customizable interface icons. These 'one-touch' icons can be presented on the user's login screen and can perform actions previously determined by the user. These icons are particularly useful for accessing push-scan to network folder functionality without needing to navigate the device address book. Implementing easily accessible icons that represent the user's most frequent actions improves the user experience and device efficiency. Users and small to medium organizations without IT staff often fail to implement these one-touch icons due to the technical difficulty. There exists a need to simplify the implementation of customizable interface options.

The configuration experience a user currently progresses through to establish push-scan functionality on a scan capable device involves complex steps necessary leading to low success rates. Users are often aware push-scan functionality exists through the device manual or marketing, but not aware of the required steps. Often the failure lies with finding the appropriate network address information, enabling the appropriate settings on both the client device and scan capable device, and configuring the address book profile. The logistic information required varies based on the digital ecosystem and can include IPv4 network address information, user credentials, file size, and administrative permissions on the network. Additionally, the two potential user interfaces the user must navigate to be successful are intended for IT staff and typically more complex. The user can configure scan capable devices remotely using an API interface or the physical user interface at the device. Beyond this interface challenge, the logistic information required is long and complex. File path names, that may need to be typed into a scan capable device, may reach 150 characters. Both configuration methods require IT knowledge many small and medium business environments are not staffed with. This leads to the push-scan functionality not being implemented, the client contracting the work to IT specialists, or the client reaching out to the original equipment manufacturer (OEM) for expensive and challenging technical support.

SUMMARY

According to aspects illustrated herein, a method for automatically configuring a scan capable device on a network for improved data distribution is disclosed. The method includes searching a network for scan capable devices. The user selects a scan capable device on the network. After selecting a scan capable device, a network share folder, in a location accessible to the client device, is established on the network. Once a network folder is established, a user profile is established on the scan capable device associating the user profile with the network share folder. After the network share folder is associated with the user, digitized data is received from the scan capable device and sent to the network share folder.

According to further aspects illustrated herein, a method for scanning a hardcopy document at a scan capable device, converting said document into digitized data, and sending digitized data to a network folder is disclosed. The method includes inputting user credentials into a graphical user interface. Upon receiving the user credentials, scan capable devices are identified on the network. Once the user selects a scan capable device, a network share folder is created on the client device, or in a network location accessible to a client device. Once the network share folder has been created, at least one user credential, corresponding to at least one shared network folder, is sent to the scan capable device. After receiving the user credentials, the scan capable device creates or modifies a selectable data entry on the scan capable device associating the selectable data entry to at least one user credential that is associated with a network share folder. Once the selectable data entry is present and associated with a network share folder and a user credential, a user digitizes a hard copy document. Once the hard copy document is digitized, the digitized data is sent to at least one network folder corresponding to the previously established user.

According to further aspects illustrated herein, a method for automatically adding one or more customized interface components to a scan capable device user interface based on a user's preference is disclosed. The method includes providing a first user interface on a client device for searching a network for scan capable devices, displaying a list of one or more scan capable devices on a network, and selecting a scan capable device from said list. After a user selects a scan capable device, a second user interface is provided on the client device. The second user interface displays potential functions capable of being automated, and allows the user to select one or more functions to be automated. Based on the user selections, a visual element is generated on the scan capable device screen. The generated visual element is automatically associated with a user's network credentials and automatically performs the previously selected functions when selected.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "scan capable device" refers to a single device or a combination of multiple devices, to perform one or more functions such as, but not limited to, printing, imaging, scanning, and so on. These devices may be used in conjunction with automatic document feeders (ADF) or other variations that improve the core functionality of the device. In the context of this disclosure, the scan capable device can be connected to a network, or directly to a client.

The term "multi-function device" refers to a single device or a combination of multiple devices, to perform one or more functions such as, but not limited to, printing, imaging, scanning, and so on. The multi-function device may include software, hardware, firmware, or a combination thereof. In the context of the current disclosure, the multi-function device is one type of network connected, scan capable device common in professional environments. For example, the multi-function device may be the scan capable device where a customized interface icon is selected. The user selection of the customized interface icon initiates one or more automated function the user previously established.

The term "network share folder" refers to a single folder in a network location accessible by both the scan capable device and the client device. The network share folder may reside on a file share server on the local network, or on a cloud server. For example, the network share folder may reside in a Microsoft OneDrive, Google Drive, or an Amazon AWS cloud server.

The term "selectable data entry" refers to an address book profile located on the scan capable device. The selectable data entry can by physically selected by a user operating the scan capable device. The selectable data entry corresponds a user's credentials to a network share folder corresponding to that user.

The term "module" shall refer to any combination or interaction of hardware, software, or instructions to carry out steps or functions as described or claimed.

BRIEF DESCRIPTION OF THE DRAWINGS

An exemplary embodiment of the present disclosure will be described in detail based on the following figures, wherein:

FIG. 1 illustrates the digital ecosystem various embodiments of the disclosure are performed on.

FIG. 2 illustrates the scan capable device operating on a digital network the various embodiments of the disclosure are performed on.

DETAILED DESCRIPTION

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Those of ordinary skill in the art will recognize a number of equivalent variations of the various features provided in the description that follows.

The present disclosure provides methods and systems for improving the process for configuring push-scan functionality between a network share folder accessible to a client device and a scan capable device. In an embodiment, the user initiates a software application and the network is searched for scan capable devices capable of push-scan functionality. Common scan capable devices in an office environment are dedicated scanners or multi-function devices (MFDs). A graphical user interface (GUI) is presented to the user through the client user device. A selectable list showing compatible devices is displayed to a user through the GUI. After selecting a target device, additional questions are presented to the user with a range of selectable answers. The user selects responses based on their intended usage of the push-scan functionality, preferred format, and desired outcomes. These responses allow the software to set the network settings for push-scan functionality for that specific user on a specific scan capable device. The user inputs the credentials corresponding to the location where the network share folder is desired to be established. The user credentials are acceptable if the network share folder is located on the client device and additional credentials may be required if the network share folder is located on a network server. The software then performs the steps of configuring the devices for push scan functionality by: enabling the settings on the client device to allow push-scan functionality, creating a network folder accessible to both the client device and scan capable device, sending user credentials, preferences, and network address folder information to the scan capable device with instructions to create a selectable entry defined by the user, and the scan capable device creating a selectable entry at the scan capable device that corresponds to the user's credentials and preferences. The user is now able to select a data entry in the address book or screen icon at the scan capable device and send digitized data directly to a network share folder corresponding to that user. The device settings and accessibility options, defined by the user through the GUI, are personalized for the user profile on that specific scan capable device.

Figure 1:
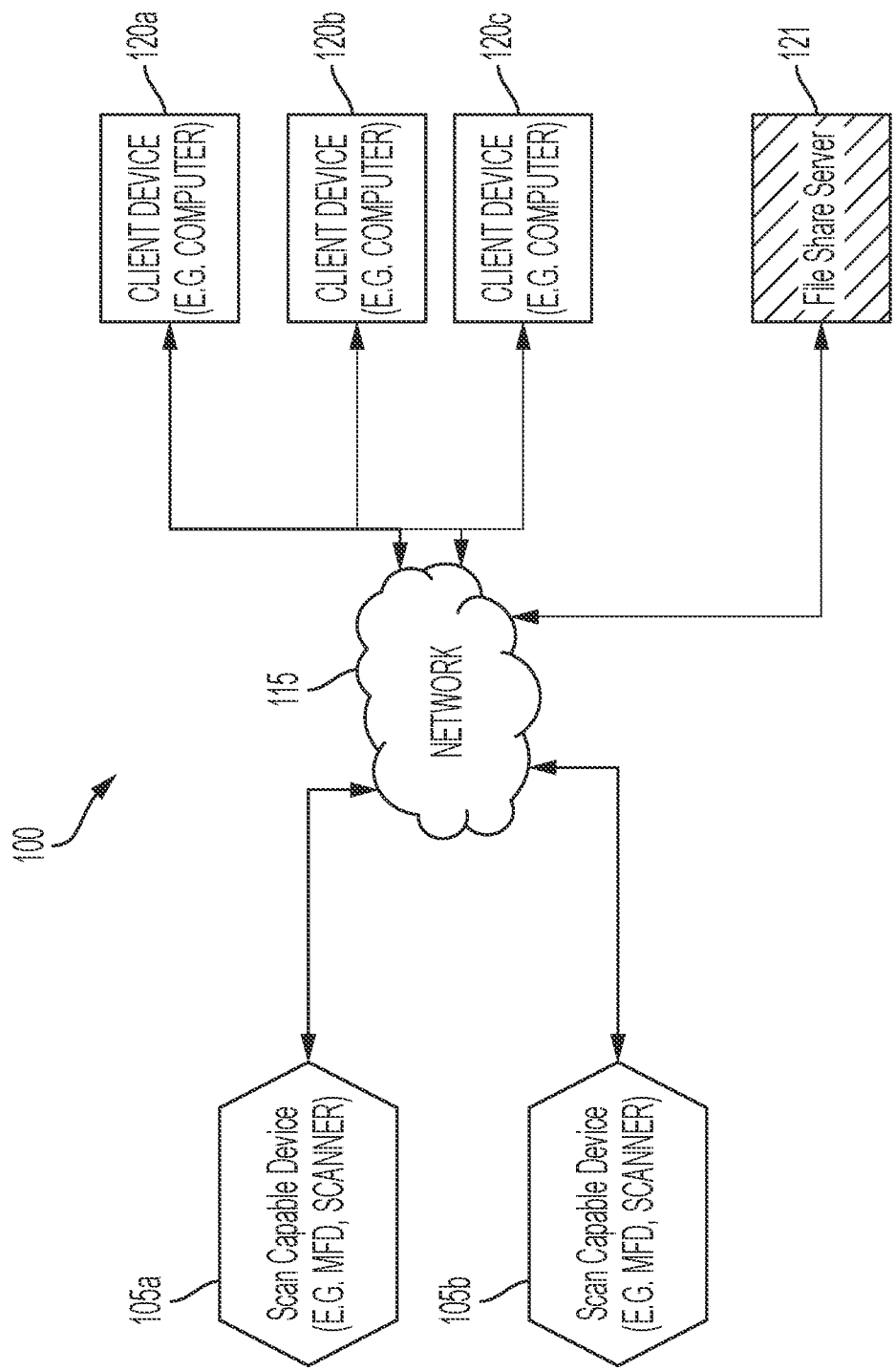
Figure 2:
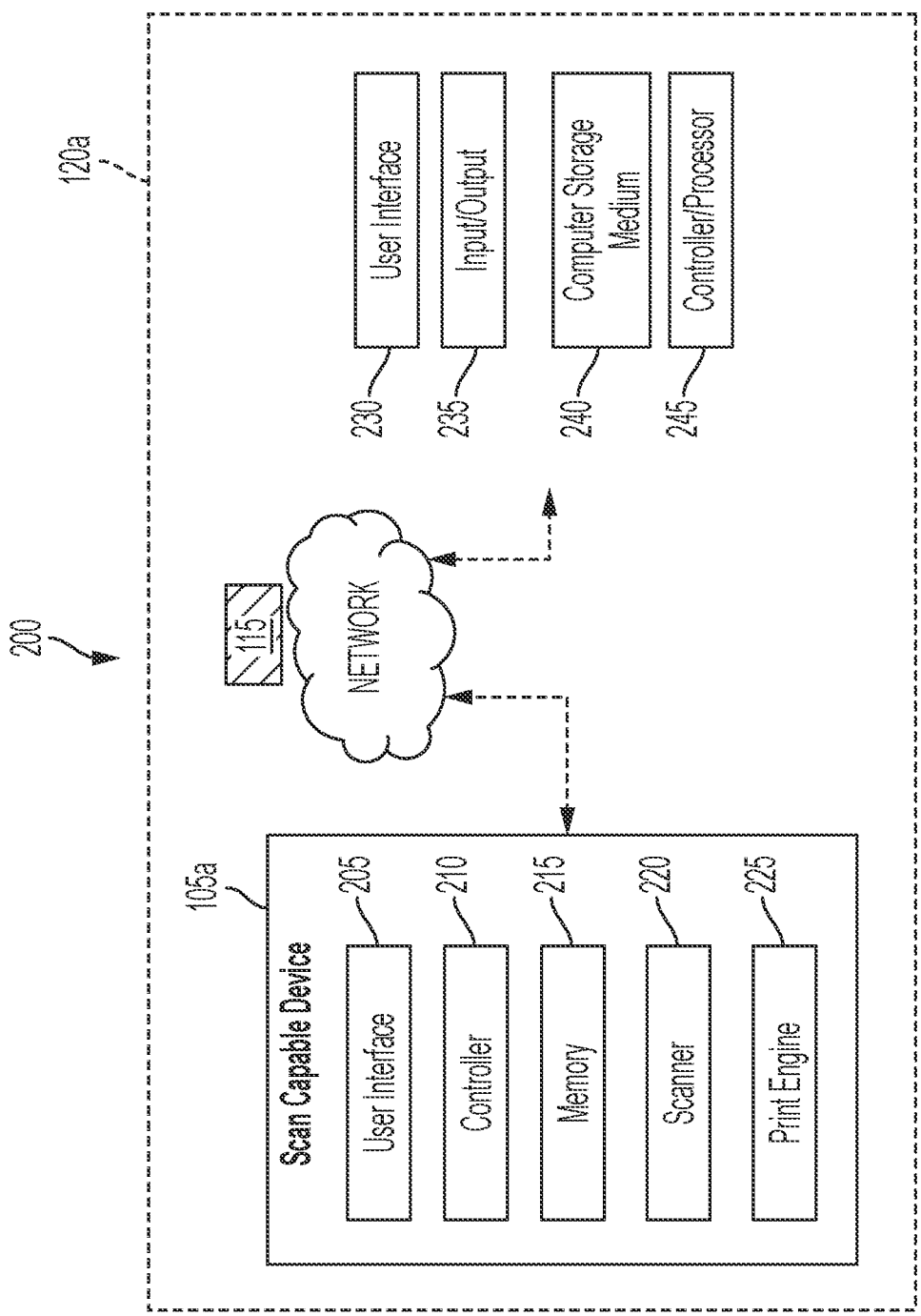
Figure 3:
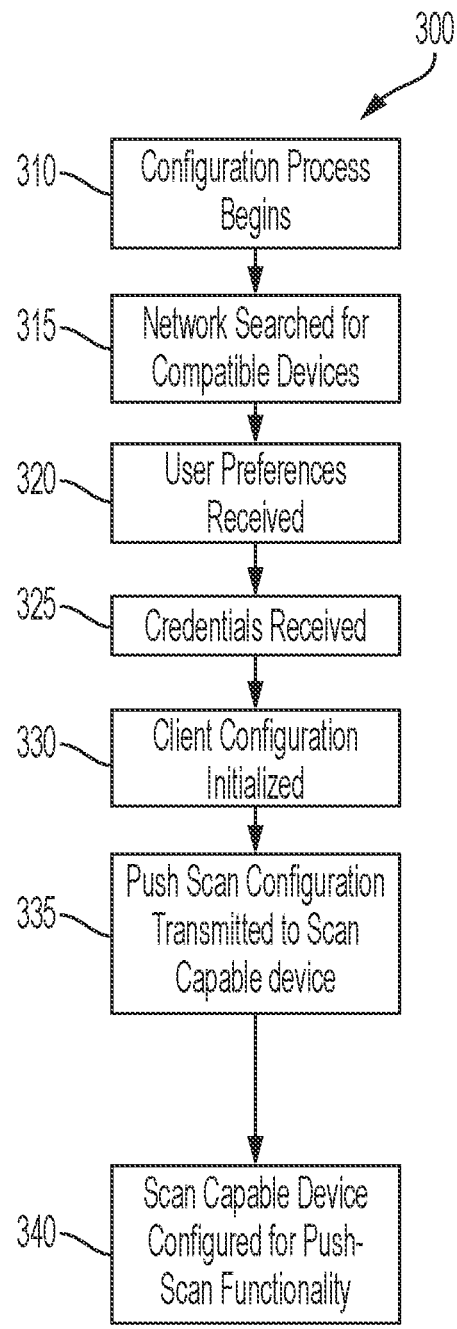
FIG. 3 illustrates an improved method for configuring push-scan functionality on between network devices shown in FIG. 1 in accordance with one embodiment of the disclosure.
Figure 4:
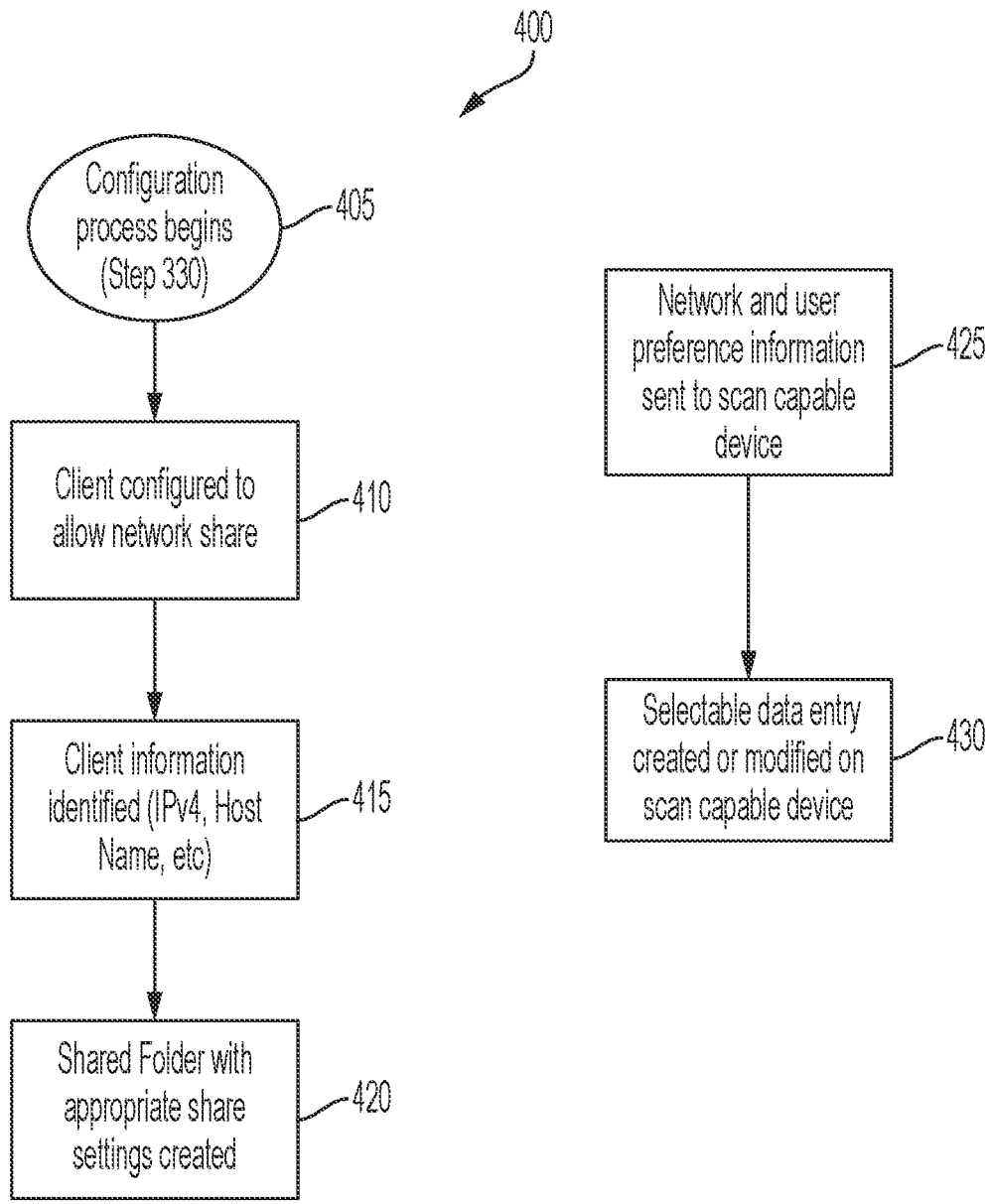
FIG. 4 illustrates the automated steps the software performs on network devices for implementing push scan functionality with one embodiment of the disclosure.

FIG. 1 shows an exemplary digital ecosystem 100 in which embodiments of the disclosure can be practiced. FIG. 2 describes the devices embodiments of the disclosure can be performed on. FIG. 3 shows an improved method for configuring push-scan functionality for an embodiment of the disclosure. FIG. 4 shows the automated steps performed to implement push-scan functionality.

FIG. 1 shows an exemplary digital ecosystem 100 in which embodiments of the disclosure can be practiced. The digital ecosystem 100 includes scan capable devices 105a and 105b capable of performing functions such as scanning and printing, a network 115, client devices 120a-c, and a server 121. The user navigates a graphical user interface (GUI) on client device 120a to input credentials and select user prompts related to their future use of push scan functionality. The input credentials correspond to the network location of the desired network share folder. The user input allows the software to set settings for that specific user. The software can set settings, automate functions, and create customized icons to facilitate the user's work flow. The software, for example, can determine from the user input whether each file should have an optical character recognition (OCR) scan performed on the digitized file or a one-touch icon created on the screen to more efficiently scan documents and send to specific network locations. When the input is complete, the software modifies the client device 120a to allow network share folder functionality. Next a network share folder is created at the user's preferred location, which could be on client device 120a or another device capable of sharing files on the network like file share server 121. The network share folder address, the user credentials, the preferences the user identified through the GUI, and a request to create an address book profile are sent to the scan capable device 105 through an application programming interface (API). The scan capable device 105a receives the request and creates (or modifies an existing) address book entry. In addition to creating an address book entry, if the user previously selected 'one-touch' functionality a selectable icon is created on the screen of the network connected, scan capable device the user selected. The one-touch selectable icon is a customizable interface for the user to more easily perform actions, such as push-scan to a network folder. Other device functionality can be performed when selecting the one-touch icon functionality, as defined by the user. The destination folder is the network share folder location the user previously selected. Settings related to push scan functionality are modified to either the defaults required for operation, or to settings that reflect the user's previously selected use case preferences.

Various examples of scan capable devices 105a and 105b can be multi-function devices (MFD), dedicated scanners, or other versions of hardware capable of digitizing physical data through scanning and sending the digitized data through a communication network 115 to a network share folder accessible to a client device 120. Scan capable device 105a and 105b can be physically different devices, for example 105a could be dedicated scanner and 105b could be multi-function device (MFD). The scan capable device 105a and client device 120a are communicatively coupled through the communication network 115. Exemplary commercial embodiments of scan capable devices 105a and 105b are the Xerox WorkCentre 7845 and Versalink C405/DN. These devices are common in home and professional offices. Small professional environments may operate with one scan capable device and one target device. The scan capable devices can be manually loaded to perform the scanning operation or modified with an automatic document feeder (ADF) to facilitate scanning to a network share folder residing on or accessible from a client device 120a-c.

The communication network 115 may be a wireless network, a wired network, or a combination thereof. The communication network may be implemented as one of the different types of networks such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, computing devices, storage devices, file share servers, and the like.

The client device 120a-c can comprise any computerized device having processing capability suitable for accessing a network including, but not limited to, desktop computers, laptop computers, tablet computers, smart phones, etc.

The server 121 can be cloud based or local device based file share server. The server 121 can be a client device 120 configured to operate as a server for the network in addition to use as a client device. The server 121 is comprised at least of a memory, a network interface, and at least one processor. Exemplary cloud based file share servers are Microsoft OneDrive, Amazon AWS, and Google Drive.

In accordance with the embodiments of the disclosure, FIG. 2 illustrates a digital ecosystem 200 wherein a scan capable device 105a is communicatively coupled to a client device 120a through a physical cable or non-contact transmission methods. As illustrated, the scan capable device 105a comprises a user interface 205, a controller 210, a memory 215, a scanner 220, and an optional print engine 225. The scan capable device 105a may include additional component(s) that support the device core functionality, such as an automatic document feeder (ADF). The components 205 through 225 are connected to each other via a conventional bus or a later developed protocol and components 205 through 225 communicate with each other for performing various functions of the present disclosure. The scan capable device 105a and target client device 120a inhabit may include, for example, a local area network (LAN), a wide area network (WAN), portions of the Internet, and so forth. Any of a wide variety of environments, including, for example, data centers (e.g., Internet data centers), office or business environments, home environments, educational or research facilities, retail or sales environments, and so forth.

The user interface 205 provides a graphical user interface (GUI) to access device settings, such as selecting address book entries or modifying device parameters, and physical buttons that allow device input in addition to buttons that initiate various device functions such as scanning or copying. Both selectable icons on the graphical user interface portion and physical buttons on the user interface can be programmed to perform user defined functions, such as scanning the data and distributing the digitized data to the network folder associated with the user credentials at the scan capable device 105a. The user interface 205 may also display any required messages or alert to the user for implementing the disclosure. The user interface 205 allows the user to perform any selection such as option manual key selection, access or modify device functionality, initiating automated functions, and so on. The user interface 205 further allows the user to select any icons or views necessary to access and utilize the scan capable device functions and settings in a user customizable manner.

The memory 215 refers to any form of storage accessible by the scan capable device such as a hard drive, a Universal Serial Bus (USB) drive, third party cloud servers, and so on. The memory 215 may store all necessary details such as address book selections, icon selection, automated functions associated with selectable icons, current user credentials, and so on for implementing the present disclosure. The controller 210 may retrieve the required details from the memory 215 to implement the current disclosure.

The controller 210 receives the input of the user through the user interface 205, or through an API request sent through the network 115 from the client device 120a. The controller 210 is communicatively coupled to the client device 120a through the network 115.

The scanner 220 scans physical documents and converts into a digital version of the document. The digitized data can be distributed to network or cloud folder locations by push-scan functionality, attached to email, or sent to a locally connected hard drive.

The print engine 225 is an optional part of the scan capable device 105a in an office environment. The print engine 225 is a marking device for an output document.

The client device 120a comprises a user interface 230, a communications port (i.e., an input/output device) 235, a computer storage medium (e.g., including, but not limited to, a non-transitory computer readable storage medium) 240, and a controller/processor 245. The client device 120a is communicatively coupled through network 245 to the scan capable device 105a. The client device 120a can be any of a variety of conventional computing devices, including desktop PCs, workstations, mainframe computers, server computers, Internet appliances, gaming consoles, handheld computers, cellular telephones, personal digital assistants (PDAs), etc. Some devices can be of the same type or alternatively different types of devices. Even if multiple devices are the same types of devices, the multiple devices may still be configured differently (e.g., having different hardware configurations, such as different processors, different RAM, different hard disk drive sizes.

The user interface 230 may also display any required messages or alert to the user for implementing the disclosure.

The communications port (i.e., the input/output device) 235 can be used for communications between the computerized device and other computerized devices over a wired or wireless telecommunication network, such as 3G or 4G wireless telecommunication network or a local area telecommunication network.

The non-transitory computer-readable storage medium 240 can comprise, for example, an optical storage device, a magnetic storage device, a capacitor-based storage device or any other suitable computer-readable storage device. This computer-readable storage device can be readable by the controller/processor 245 and can store programs of instructions (e.g., applications) that the controller/processor 245 can execute to allow the computerized device 120a to perform its various functions and, particularly, the method steps discussed in detail above.

The controller/processor 245 can control the various actions of the client device 120a to implement the current disclosure.

In accordance with the embodiments of the disclosure, FIG. 3 illustrates an improved method for configuring push-scan functionality on a digital network 300. Prior to the configuration process beginning, the user acquires the software. The configuration process 310 begins from a client device 120a. The user is presented a graphic user interface (GUI) on the client device 120a. In step 315, the software searches the network for compatible devices using a discovery protocol. In 320 the GUI shows the user a series of prompts to identify both required and optional information related to configuring the devices. The user now selects a target location for the network share folder, a scan capable device to establish push-scan functionality with and use case descriptions related to their future use of push scan functionality, among other information. The user can choose 'default' use case descriptions to continue the configuration. The user inputs their credentials 325 if the desired share folder location is on the local PC. If the desired share folder location is not located on the client device, then input credentials 325 correspond to the network location associated with the target folder location. Multiple sets of credentials can be input through the GUI as required to operate on the network. After the user preferences 320 and credentials are received 325, the software begins configuring push scan functionality between a folder accessible to the client device and the scan capable device. In step 330, the client device 120a is configured to support push scan functionality. In step 335, a request is sent to the target scan capable device 105a through the network 115. In step 340, the request is received by the scan capable device 120a and the device is configured for push-scan functionality. Push scan functionality is established at a scan capable device 105a, allowing digitized data to be distributed to a network folder location corresponding to a selectable user profile on the scan capable device. In addition, customized settings and interface options will be associated with that user profile at that scan capable device 105a.

Prior to step 310, the user acquires the software to perform the configuration steps 300. The software can be acquired from internet sources like the original equipment supplier (OEM) website, or through CD or USB hard drives accompanying the purchase of the equipment. The software to perform the improved configuration method 300 can be bundled with other software packages such as print drivers. The software 300 to configure push-scan functionality can be installed or initiated by an organization's IT resources, or remote IT resources, for many users via a general update to clients on a network or specific users. If the user logs off one client device and logs into a second device, the share folder will be available to the user on the second device.

In step 310, the user has acquired the software and has executed the software file on client device 120a. A graphical user interface (GUI) is presented to the user through the client device 120a to support the improved configuration method 300.

In step 315, the client device 120 searches the network 115 for compatible devices to provide the user with a selectable list of scan capable devices. Scan capable devices 105a and 105b are exemplary scan capable devices. The scan capable device 105 can be discovered by a Simple Network Management Protocol (SNMP) that identifies compatible devices on the network 115. Other embodiments of the disclosure use various application layer discovery protocols such as Simple Service Discovery Protocol (SSDP) or Dynamic Host Configuration Protocol (DHCP) based on the operating system and network requirements.

In step 320, user preferences are received through the GUI displayed on the client device 120a. The user identifies the network folder address location the scan capable device 105a will distribute digitized data to. The network folder is in an accessible network location for both the scan capable device 105a and client device 120a. The user preferences optionally selected in 320 include whether to install a one-touch icon on the screen to prevent the user from navigating the scan capable device address book, whether the device should automatically perform optical character recognition (OCR), and the like. These user responses represent modifiable parameters or automatable functions on the scan capable device the software can set to improve the user experience, including associating automated actions with physical or digital buttons. The software can personalize settings and set the parameters of any setting a user could modify when physically modifying the scan capable device. In a professional environment this increased efficiency benefits usability of the scan capable device. Low skill users do not consume the device physical interface bandwidth. The personalized experience benefits the user by simplifying tasks repeated often or integrating future actions the user would need to take to edit the document. Scan capable device functionality, like optical character recognition, can be automatically performed on each document by the client before being pushed to the network share folder corresponding to that user. Additional functionality can be file size, embedding a watermark, or protecting a document by enabling a security key at the first document opening can be selected.

In step 325, the credentials associated with the network folder location the user selected in 320 (as the destination for push-scan functionality) are received by the software at the client device 120a. The network folder location can be on a client device 120a-c, or a file share server 121. The file share server 121 can be a physical server connected to the network or cloud based file share server.

In step 330, the software configures client 120a for push-scan functionality. The client 120a is configured to enable network share functionality primarily through enabling specific communication protocols in the Windows operating system. SMB protocol is the preferred protocol for the scan capable device and client device to communicate and transport files. SMB protocol is an application layer protocol compatible with MacOS and Linux operating systems with minor modifications.

In step 330, the software creates a network share folder in the user defined network location from the user inputs 320 and input credentials 325. The share folder location created in 330 can be located on the client device, or alternatively on the network in a location accessible to both the scan capable device and client device. Additionally, the share folder is associated with a user based on credentials the digital ecosystem already recognizes the user by. These user credentials can be associated by biometrics, ID numbers, and other variants that identify a user on their network. The user has the option, but is not required, to develop custom credentials for the push-scan functionality from the client device or the scan capable device interface. The default settings for credentials, transfer speeds, and file size the executed software selects satisfies the requirements of most clients seeking to establish push-scan functionality in a small to medium work environment. Additionally, if the user logs off one client device and logs into a second device, the share folder will be available to the user on the second device.

In step 335, the network share folder IP address and file share detail, the user credentials and/or the credentials for the share folder, the preferences the user identified through the GUI, and a request to create an address book profile are sent to the scan capable device 105a through a representational state transfer (REST) API. This embodiment is performed on the proprietary REST API, and other embodiments may use different APIs formats.

In step 340, the scan capable device 105a receives the request and creates (or modifies an existing) address book entry through an embedded HTTP server application residing on the printer and accessible to networked printers, client devices, and the internet. Xerox CentreWare Internet Services (CWIS) is exemplary of an embedded HTTP server application. CWIS allows the user to perform the functions the user could modify if logged in and operating the scan capable device physically. Push scan functionality is established at a scan capable device 105*a*, allowing digitized data to be distributed to a network folder location corresponding to a selectable user profile on the scan capable device. In addition, customized settings and interface options identified by the user in step 320 will be associated with the user at that scan capable device 105*a*.

In step 340, customized functionality interface options can be added to a scan capable device as part of the user preferences identified in 320. Selecting these icons begins a previously established function or operation identified in step 320. The customized interface options allow the user to perform actions such as 'Scan-To-Me 1-Touch' which sends documents directly back to the client device without needing to navigate the address book. Other functionality may be to perform optical character recognition (OCR) for each document digitized, or to print a copy of a scanned document in addition to distributing the digitized document to the network. Other actions could be to send files to multiple folder locations or send confirmation emails. The selectable icons can be located on the Home Screen of the scan capable device for ease of access. Implementing personalized functions decreases the amount of time the user is at the scan capable device, improves the accuracy of their desired actions, and simplifies the user experience by minimizing the number of steps required to accomplish a task. Minimizing the steps a user has to take to accomplish a task is a known metric for evaluating the user experience on the internet, electronic devices such as cell phones, and other devices where a user navigates. Establishing customizable interface functionality into scan capable devices requires IT knowledge that prevents broad acceptance. This functionality simplifies the implementation of customizable interface options and increases the user experience on the digital display of a scan capable device.

A successful installation leads to the user optionally exiting the GUI. The user can choose to repeat the configuring process with additional scan capable devices on the network or modify the existing configuration previously established.

In the event of an unsuccessful configuration, the GUI directs the user to a support contact portal can be customized to be the original equipment manufacturer (OEM), a third party installer of the devices, a third party contractor who supports the IT infrastructure, or other service professionals.

In FIG. 4 the automated steps performed by the software shown in step 330 and 340 are shown. In steps 405 through 420 the client device 120*a* is configured for push scan functionality (step 330). In steps 425 through 435 the scan capable device 105*a* is configured for push-scan functionality and custom interface options defined in step 320.

In step 410, the software configures client 120*a* for push-scan functionality. The client 120*a* is configured to enable network share functionality primarily through enabling specific communication protocols in the Windows operating system. SMB protocol is the preferred protocol for the scan capable device and client device to communicate and transport files. SMB protocol is an application layer protocol compatible with MacOS and Linux operating systems with minor modifications.

In step 415, the client network information is identified. This includes the network address (IPv4 or equivalent addressing protocol) and administrative network credentials.

In step 420, the software creates a network share folder in the user defined network location from client information identified in 415. The share folder location created can be located on the client device, or alternatively on the network in a location accessible to both the scan capable device and client device. Additionally, the share folder is associated with a user based on credentials the digital ecosystem already recognizes the user by. These user credentials can be associated by biometrics, ID numbers, and other variants that identify a user on their network. Additionally, if the user logs off one client device and logs into a second device, the share folder will be available to the user on the second device.

In step 425, the network share folder IP address, the user credentials and/or the credentials for the share folder, the preferences the user identified through the GUI, and a request to create an address book profile are sent to the scan capable device 105*a* through a representational state transfer (REST) API. This embodiment is performed on the proprietary REST API, and other embodiments may use different APIs formats.

In step 430, the scan capable device 105*a* receives the request and creates (or modifies an existing) address book entry through an embedded HTTP server application residing on the printer and accessible to networked printers, client devices, and the internet. Xerox CentreWare Internet Services (CWIS) is exemplary of an embedded HTTP server application. CWIS allows the user to perform the functions the user could modify if logged in and operating the scan capable device physically. Push scan functionality is established at a scan capable device 105*a*, allowing digitized data to be distributed to a network folder location corresponding to a selectable user profile on the scan capable device. In addition, customized settings and interface options identified by the user in step 320 will be associated with the user at that scan capable device 105*a*.

Figure 5:
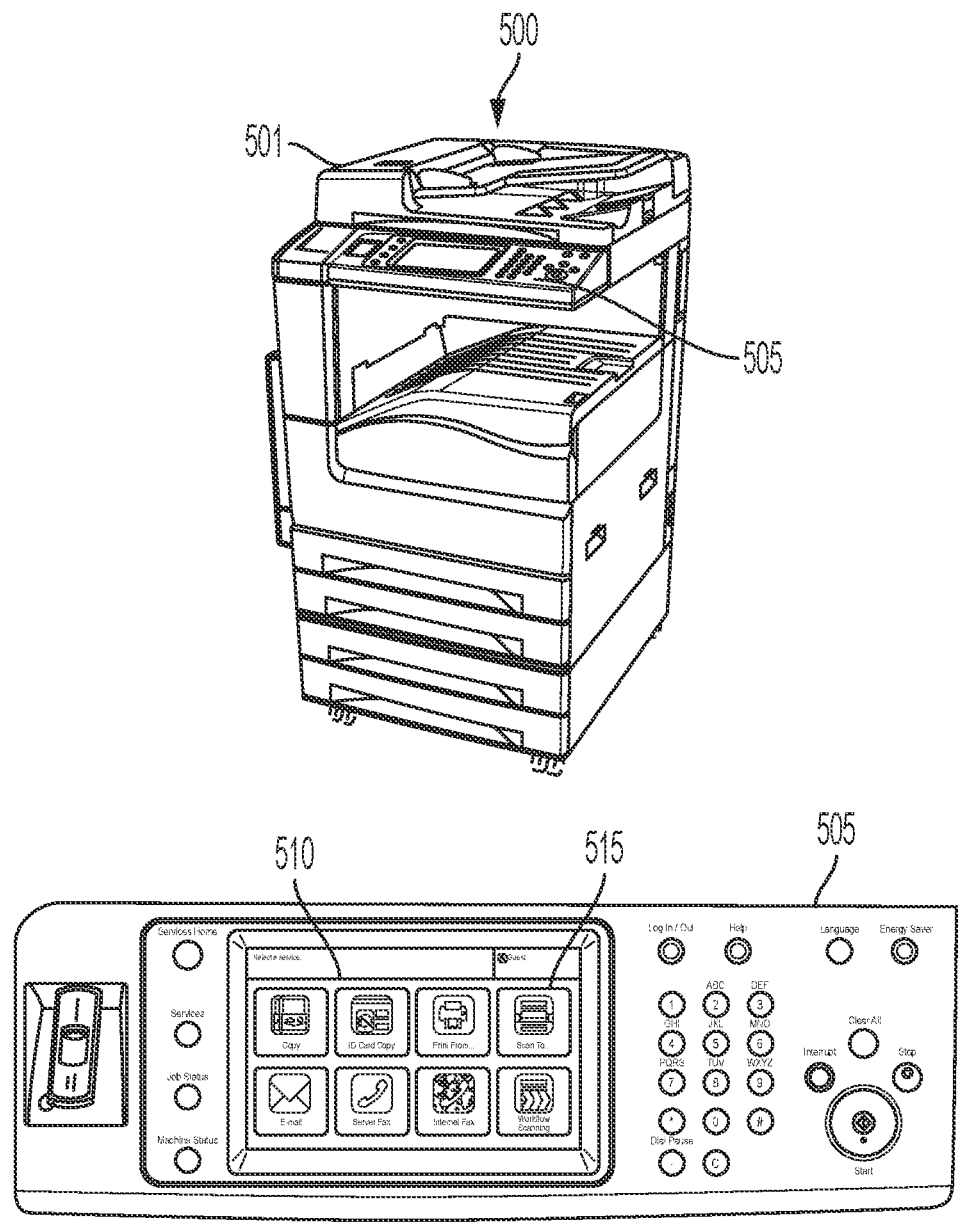
FIG. 5 illustrates a scan capable device with a user interface displaying a customizable interface icon in accordance with one embodiment of the disclosure.

FIG. 5 illustrates a digital ecosystem 500 equipped with a scan capable device 501 in accordance with one embodiment of the disclosure. The scan capable device 501 includes a user interface 505 displaying a customizable interface icon 515 on a digital user interface 510. The user interface 505 can include a digital user interface 510 and a physical user interface 520.

The digital ecosystem 500 may include hardware and software accessible to the scan capable device 501 through multiple communication network types. The communication network may be implemented as one of the different types of networks such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another.

The digital ecosystem 500 includes the scan capable device 501. The scan capable device 501 refers to a single device or a combination of multiple devices, to perform one or more functions such as, but not limited to, printing, imaging, scanning, and so on. These devices may be used in conjunction with automatic document feeders (ADF) or other variations that improve the core functionality of the device. In the context of this disclosure, the scan capable device can be connected to a network, or directly to a client.

The scan capable device 501 includes a user interface 505. In some embodiments of the disclosure, the user interface 505 may include the digital user interface 510 in addition to a physical user interface 520. The digital interface 510 can be presented to a user through other displays, such as a mobile device or client computer, that are communicatively coupled to the scan capable device 501.

The customizable interface icon 515 may be automatically associated with functionality based on the user preferences selected in 320. Exemplary functions include optical character recognition (OCR) and sending digitized data to specific locations on the network. These customizable interface icons 515 can be modified or removed by the user after the initial placement of the icon on the digital user interface 510.

What is claimed is:

1. A scan capable device for converting a document into digitized data, comprising:
    a scanner;
    a user interface; and
    a controller, interactive with the scanner, the user interface, and an external network, the controller configured to:
        receive a one-time API request from a client device of a user, wherein the one-time API request includes a target location for a network folder and a user credential, wherein the target location and the network folder are established by the client device before the one-time API request is received;
        create, using the one-time API request, a one touch selectable data entry associated with the network folder at the target location on the scan capable device, wherein the network folder is accessible by the scan capable device and the client device;
        associate, using the one-time API request, the user credential to the one touch selectable data entry;
        associate, using the one-time API request, a user defined function with the one touch selectable data entry;
        upon selection of the one touch selectable data entry, digitize a document; and
        send digitized data to the network folder corresponding to the user credential.

2. The scan capable device of claim 1, wherein the scan capable device includes print functionality.

3. The scan capable device of claim 1, wherein the scan capable device includes an automatic document feeder.

4. The scan capable device of claim 1, wherein the network folder corresponding to the user credentials is on a cloud-based file share server.

5. The scan capable device of claim 1, wherein the network folder is located on a client device connected to the network.

6. The scan capable device of claim 1, wherein the one touch selectable data entry is created automatically based on the user credentials.

7. The scan capable device of claim 1, wherein optical character recognition is performed on the digitized data by the scan capable device.

8. A method for scanning a document at a scan capable device, the method comprising:
    receiving user credentials from a graphical user interface of a client device;
    displaying on the graphical user interface of the client device scan capable devices on a network;
    creating a shared network folder at a target location accessible to the scan capable device and the client device; and
    sending, by a one-time API request, a user credential corresponding to the shared network folder at the target location to the scan capable device, wherein the one-time API request causes the scan capable device to create a one touch selectable data entry associated with the shared network folder at the target location on the scan capable device and to associate a user defined function with the one touch selectable data entry, wherein upon selection of the one touch selectable data entry, the scan capable device digitizes a document in accordance with the user defined function and sends the digitized document to the shared network folder corresponding to the one touch selectable data entry.

9. The method of claim 8, wherein the scan capable device is both print and scan capable.

10. The method of claim 8, wherein digitizing data is performed by a scan capable device equipped with an automatic document feeder.

11. The method of claim 8, wherein the client device comprises a mobile, network connected device.

12. The method of claim 8, wherein at least two user credentials corresponding to the shared network folder are sent to the scan capable device.

13. The method of claim 8, wherein the network folder is located on a cloud server.

14. The method of claim 8, wherein the shared network folder is located on a client device connected to the network.

15. The method of claim 8, wherein the shared network folder network location is selected automatically based on the user credentials.

16. The method of claim 8, wherein optical character recognition is performed on the digitized data by the scan capable device.

17. A scan capable device for converting a document into digitized data, comprising:
    a scanner;
    a user interface; and
    a controller, interactive with the scanner, the user interface, and an external network, the controller configured to:
        receive a one-time API request from a client device of a user, wherein the one-time API request includes a target location for a network folder and a user credential, wherein the target location and the network folder are established by the client device before the one-time API request is received;
        create, using the one-time API request, a one touch selectable data entry associated with the network folder at the target location on the scan capable device, wherein the network folder is accessible by the scan capable device and the client device;
        associate, using the one-time API request, the user credential with the one touch selectable data entry;
        associate, using the one-time API request, a user defined function with the one touch selectable data entry; and
        upon selection of the one touch selectable data entry, perform the user defined function to digitize a document and to send digitized data to the network folder corresponding to the user credential.

18. The scan capable device of claim 17, wherein the user defined function is sending a digitized document to a network folder associated with the user's credentials.

19. The scan capable device of claim 17, wherein the selected scan capable device comprises both print and scan capability.

20. The scan capable device of claim 17, wherein the user defined function performed at the scan capable device comprise of performing optical character recognition on the digitized document and sending to a network folder associated with the user's credentials.

21. The scan capable device of claim 17, wherein the user interface is through a mobile device communicatively coupled with the scan capable device.

\* \* \* \* \*